W. E. WOODS.
TENSION DEVICE FOR HARNESS REINS.
APPLICATION FILED SEPT. 16, 1909.
951,716.
Patented Mar. 8, 1910.
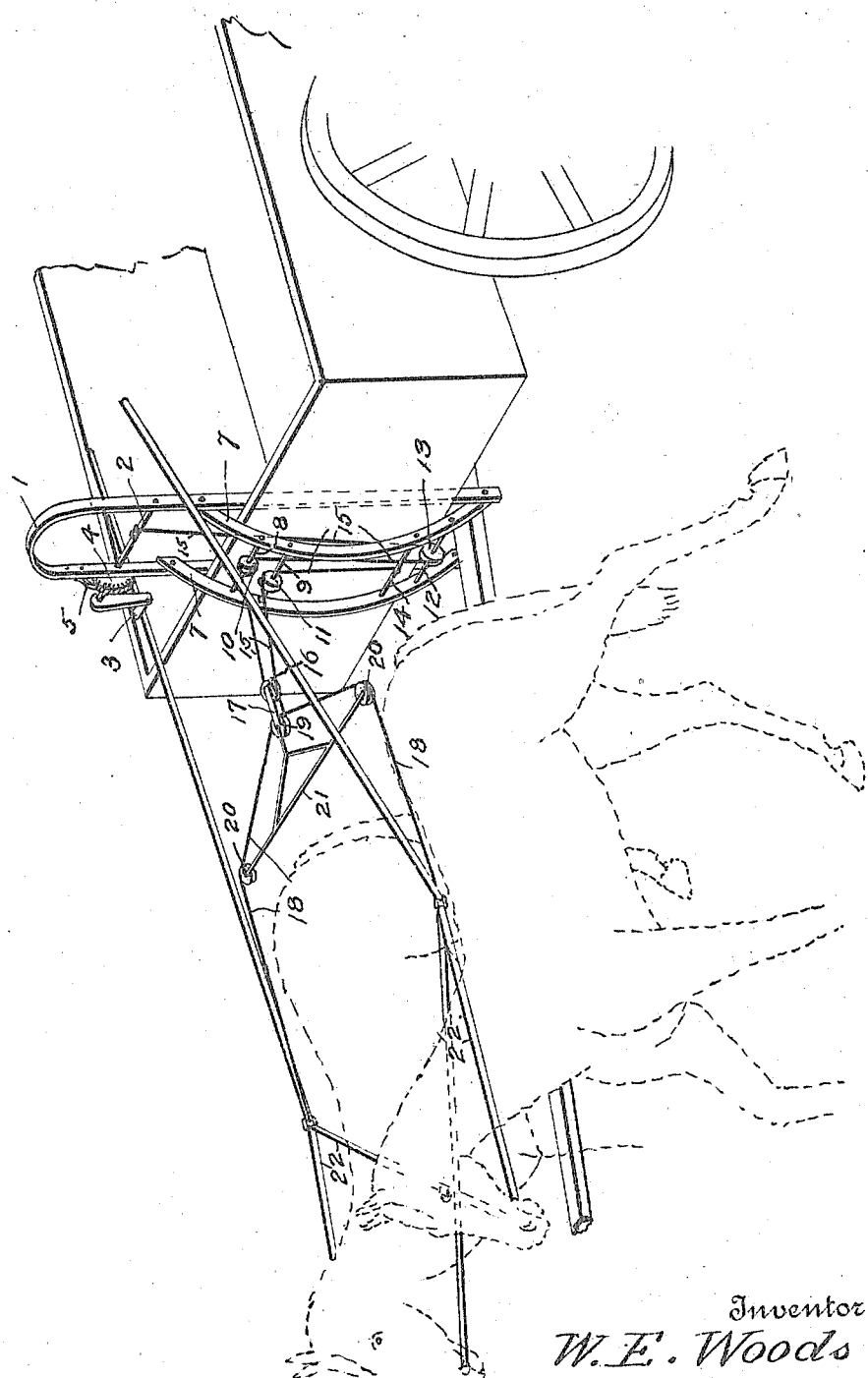
Witnesses
E. E. Duffy
C. H. Giesbauer
Inventor
W. E. Woods
by H. B. Willson & Co.
Attorneys

UNITED STATES PATENT OFFICE.

WILLIAM E. WOODS, OF GRIFFIN, INDIANA.

TENSION DEVICE FOR HARNESS-REINS.

951,716.  Specification of Letters Patent.  Patented Mar. 8, 1910.

Application filed September 16, 1909. Serial No. 518,069.

*To all whom it may concern:*

Be it known that I, WILLIAM E. WOODS, a citizen of the United States, residing at Griffin, in the county of Posey and State of Indiana, have invented certain new and useful Improvements in Tension Devices for Harness-Reins; and I do declare the following to be a full, clear, and exact description of the invention, such as will enable others skilled in the art to which it appertains to make and use the same.

This invention relates to a tension device for harness reins and has for its object to provide a simple device that may be attached to the vehicle whereby the front ends of the reins may be held at the desired tension without the aid of the driver, while the free or rear ends of the reins may remain loose and be used only for guiding the draft animals. By means of my device, a sufficient pull may be exerted upon the lines to check or stop the horses in case of a runaway. Furthermore, by the use of my device, the necessity of hitching the horses when a stop is made and the driver leaves the wagon, is obviated.

With this and other objects in view, the invention consists of certain novel features of construction, combination and arrangement of parts as will be more particularly described and particularly pointed out in the appended claims.

In the drawings, the figure is a perspective view of a diagrammatic character showing the application of the device.

In the embodiment illustrated, the releasing device comprises a U-shaped frame 1, which is suitably mounted at the front of the vehicle and is provided at its upper end with a transverse winding shaft 2, provided at one end with the crank handle 3, and near the crank handle with a ratchet wheel 4, adapted to be engaged by a spring controlled pawl 5, whereby the winding shaft 2 may be held against turning.

A forwardly curved pulley supporting frame, consisting of the longitudinal or side pieces 7, is mounted in front of the frame 1 and is provided at its upper end with a pair of vertically spaced cross rods 8 and 9, upon which are mounted the pulleys 10 and 11. The frame 7 is also provided at its lower end with a cross rod 12, upon which is mounted the pulley 13, and with a second cross piece 14, above the cross rod or piece 12. A pull cord or cable 15, is attached at one end to the cross rod 14 and passes upwardly over the pulley 11, then forwardly over a pulley 16, suitably mounted in rear of a pulley supporting frame 17, then passes over the pulley 10, then downwardly over the pulley 13, and then up and winds upon the winding shaft 2. A rein-engaging cord 18, passes over a pulley 19, mounted at the front side of the pulley supporting frame 17 and somewhat in advance of the pulley 16, and also over pulleys 20, mounted at opposite ends of the cross piece 21, of the frame 17, which holds the side portions of the rein-engaging cord in proper spaced relation. The ends of the cord 18 are connected with the reins 22.

From the foregoing description, it will be apparent that in order to exert a severe pull upon the reins 22 in order to check the horses in case of an attempted run-away, it is only necessary for the operator to turn the winding shaft 2 to wind the pull cord thereupon.

From the foregoing description, taken in connection with the accompanying drawing, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim is:—

1. A tension device for harness reins comprising a rein engaging cord, a winding shaft, a pulley supporting frame, a pull cord having one end fixed to said frame and passing over the pulley thereon and its other end winding upon the winding shaft, and a pulley connection between the pull cord and the rein engaging cord, whereby a pull upon the former will be communicated to the latter.

2. A tension device for drive reins comprising a rein engaging cord, a pulley supporting frame to hold the ends of said cord which are connected with the reins in spaced relation, a pull cord, a winding shaft for the pull cord, and a pulley connection between the pull cord and the central portion of the rein engaging cord, whereby a pull upon the former will be communicated to the latter.

In testimony whereof I have hereunto set my hand in presence of two subscribing witnesses.

WILLIAM E. WOODS.

Witnesses:
NOAH P. RUNYON,
WILLIAM E. PRICE.